United States Patent
van der Bleek et al.

[11] Patent Number: 6,120,861
[45] Date of Patent: *Sep. 19, 2000

[54] STRETCHED TUBULAR FILM FOR HOLDING FOODSTUFF

[75] Inventors: Mark van der Bleek, Rossville; David Pohl, Danville, both of Ill.

[73] Assignee: Teepak Investments Inc., Wilmington, Del.

[*] Notice: This patent is subject to a terminal disclaimer.

[21] Appl. No.: 08/568,076

[22] Filed: Dec. 6, 1995

[51] Int. Cl.[7] .............................. A22C 13/00; A23G 1/00; B29C 47/20; B29D 22/00

[52] U.S. Cl. .................... 428/34.8; 428/34.8; 428/35.2; 428/35.7; 428/36.9; 428/36.92; 426/105; 426/135; 426/413; 264/188; 264/197; 264/198

[58] Field of Search ................. 428/34.8; 138/118.1; 229/DIG. 10; 264/176.1, 188, 196, 197; 426/105, 135, 413

[56] References Cited

U.S. PATENT DOCUMENTS

| | | | |
|---|---|---|---|
| 2,999,756 | 12/1961 | Shiner et al. | 99/176 |
| 2,999,757 | 9/1961 | Shiner | 99/176 |
| 3,835,113 | 9/1974 | Burke et al. | 260/216 |
| 4,246,221 | 1/1981 | McCorsley, III | 264/203 |
| 4,590,107 | 5/1986 | Bridgeford | 428/36 |
| 4,784,186 | 11/1988 | Stenger et al. | 138/118.1 |
| 5,277,857 | 1/1994 | Nichloson et al. | 264/187 |

FOREIGN PATENT DOCUMENTS

| | | |
|---|---|---|
| 0 662 283 | 7/1995 | European Pat. Off. . |
| 793789 | 12/1955 | United Kingdom . |
| WO 82/02649 | 8/1982 | WIPO . |

*Primary Examiner*—Ellis Robinson
*Assistant Examiner*—John J. Figueroa
*Attorney, Agent, or Firm*—Michael L. Dunn

[57] ABSTRACT

A tubular film for encasing food. The tubular film comprises a material which has been regenerated from a solution of cellulose in a solvent comprising carbon disulfide. The tubular material is longitudinally stretched by from 8 to 30 percent and transversely stretched by from −3 to +10 percent while wet and the stretch is maintained during drying, said transverse stretch being less than 75 percent of the longitudinal stretch, to obtain a longitudinal crystalline orientation. In general, the tubular material has a wall thickness of from 75 to 90 percent of a tubular material which is identical except for being longitudinally unstretched. The invention also includes the method for making the tubular material by stretching the tubular material while wet and maintaining the stretch during drying.

9 Claims, 1 Drawing Sheet

STRETCHED TUBULAR FILM FOR HOLDING FOODSTUFF

BACKGROUND OF THE INVENTION

This invention relates to tubular film for encasing food products such as sausage and cheese. The invention more particularly relates to such casing material made from regenerated cellulose.

Food casings made from regenerated cellulose have been known for an extended period of time and can be made using methods well known to those skilled in the art. In particular, xanthate viscose is made by treating cellulose from cotton, wood, or other plant fiber with alkali followed by dissolving in carbon disulfide. The resulting viscose is then extruded through a die to form a tube. The resulting tube is then regenerated, usually by passing it through a coagulating bath containing coagulating materials such as sodium sulfate, and sulfuric acid. The casing is then dried.

U.S. Pat. Nos. 2,999,756 and 3,835,113 describe such processes in detail.

It is also known that cellulose containing casings can be made by extruding viscose onto a cellulose fiber web, usually a non-woven paper, shaped in the form of a tube, followed by regeneration. Such casings are known as "fibrous" casings.

The term "regenerated cellulose food casings" as used herein is intended to include both types of casings.

Regenerated cellulose food casings have been successful for a number of reasons including relatively low cost, permeability to smoke, strength and dimensional stability.

Despite the advantages of regenerated cellulose food casings, there are a number of areas where properties could be improved. In particular, longitudinal dimensional stability is not as good as desired, especially when the casing is wet, i.e. a stuffed food casing will have unacceptable longitudinal stretch when hung vertically, e.g. in a smoke house or for purposes of curing. Such stretch can be as much as ten percent or more.

While regenerated cellulose food casings have fair permeability, it is still not as good as desired. And in order to obtain sufficient strength, the wall of the casing has been thicker than desired. Thicker walls use more viscose material than desired, decrease permeability, and reduce the quantity (unshirred length) of casing that can be shirred (longitudinally folded and compressed) into a standard unit of shirred length.

Attempts have been made to make such casings with thinner walls by variation of processing conditions, e.g. chemical changes in the regenerating bath as described in U.S. Pat. No. 4,590,107. Unfortunately such thin wall casings have had insufficient burst strength and tensile strength for commercial application.

BRIEF DESCRIPTION OF THE INVENTION

The invention comprises a tubular film for encasing food. The tubular film comprises a material which has been regenerated from a solution of cellulose in a solvent comprising carbon disulfide. The tubular material is longitudinally stretched by from 8 to 30 percent and transversely stretched by from −3 to +10 percent while wet and the stretch is maintained during drying, said transverse stretch being less than 75 percent of the longitudinal stretch, to obtain a longitudinal crystalline orientation. In general, the tubular material has a wall thickness of from 75 to 90 percent of a tubular material which is identical except for being longitudinally unstretched.

The invention also includes the method for making the tubular material by stretching the tubular material while wet and maintaining the stretch during drying.

DETAILED DESCRIPTION OF THE INVENTION

In accordance with the invention, the tubular material 10 comprises regenerated cellulose 11 and is a food casing for foodstuffs such as sausage and cheese. The casing is made by extruding viscose (cellulose dissolved in carbon disulfide) either into the form of a tube or to impregnate a fiber web formed in the shape of a tube.

While it is still wet, the tubular material is longitudinally stretched by from 8 to 30 percent, and usually from 10 to 20 percent, and transversely stretched by from −3 to +10 percent and the stretch is maintained during drying, said transverse stretch being less than 75 and preferably less than 50 percent of the longitudinal stretch, to obtain a longitudinal crystalline orientation. In general, the tubular material has a wall thickness 12 of from 75 to 90 percent of a tubular material which is identical except for being longitudinally unstretched.

In general, for a food casing of a diameter usual for a hot dog, the casing has a wall thickness of between 18 and 25 microns and usually between 21 and 23 microns.

In addition the food casing of the invention has a permeability to smoke and other vapors which is from 20 to 50 percent greater than the same casing except not being longitudinally stretched to obtain the thin wall.

The other physical properties of the casing of the invention, despite having a significantly thinner wall, are surprisingly close to longitudinally unstretched casing. For example the burst pressure is is at least 88 percent, and usually at least 95 percent of the burst pressure of a longitudinally unstretched casing. The longitudinal tensile strength is at least 85 percent, usually at least 90 percent and commonly over 100 percent of the longitudinal tensile strength of the same casing except for being longitudinally unstretched.

The following example serves to illustrate and not limit the present invention.

EXAMPLE

Figure 1:
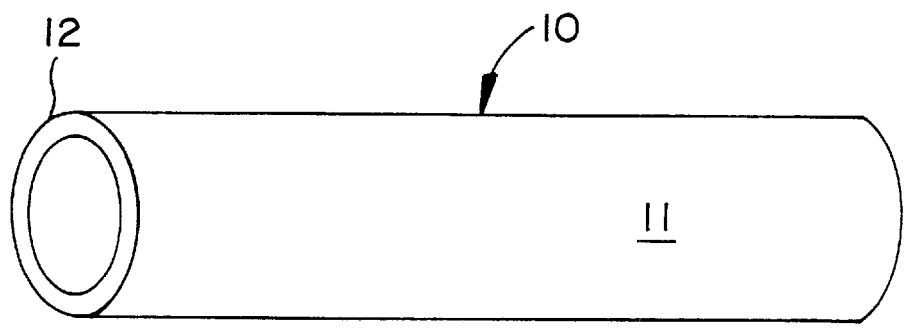
FIG. 1 shows a perspective view of a tubular film of the invention.
Figure 2:
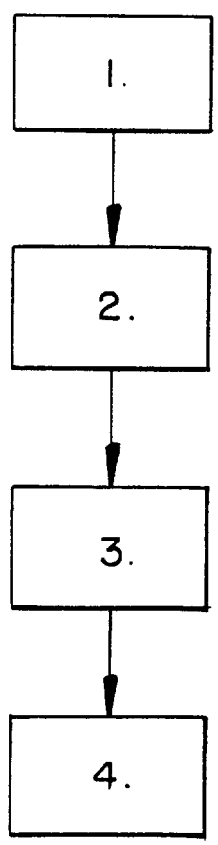
FIG. 2 shows a block diagram of the method of the invention.

In general the tubular film of the invention was made by the following steps shown in the process blocks of FIG. 2:

1. extruding a tube from viscose;
2. coagulating the tube in a bath comprising acid and salt to to form a regenerated cellulose tubular film;
3. longitudinally stretching the film by from 8 to 30 percent and transversely stretching the film by from −3 to +10 percent while wet, said transverse stretch being less than 75 percent of the longitudinal stretch; and
4. maintaining said stretch during drying, to form a dry tubular film having a wall thickness of from 75 to 90 percent of a tubular film which is identical except for being longitudinally unstretched.

Viscose was made essentially as described in U.S. Pat. No. 3,835,113 and, except as otherwise indicated, was extruded and regenerated substantially as described in U.S. Pat. No. 2,999,756. The die was for a code 24 casing (about 25.4 mm wet flat stock width). The extrusion speed was set at 128 feet per minute, the wet end machine speed was 123.1 feet per minute allowing for a shrinkage of 3.8 percent at the wet end up to the dryer. The speed at the end of the dryer was varied from 120 to 160 feet per minute to vary the dryer stretch from −2.5 percent to +30 percent. The coagulation (regeneration) bath contained a sulfuric acid concentration of 132 grams per liter and a sodium sulfate salt concentration of 253 grams per liter. For purposes of plasticization, the casing is passed twice through tanks containing glycerine at the wet end to obtain a glycerine content of about 15.4 percent. The flow of viscose at the point of extrusion is sufficient to yield a thickness of about one mil if unstretched. After extrusion, the casing is inflated with air to expand the diameter to about 20 mm.

The results are shown in the table. The table clearly shows the effects of maintaining longitudinal stretch in the dryer. Strength properties are not significantly altered but the thickness of the casing is substantially less and vertical stretch is greatly reduced. Permeability studies show better permeability at the reduced thickness.

In the table, the following abbreviations are used:
BDG=bone dry gauge, the thickness of the dry film in grams of cellulose per ten meters of length.
DFW=dry flat width., 0.24 means code 24 as used in the industry which is a width of about 32.7 mm.
fpm=feet per minute.
gpm=gallons per minute.

TABLE

| Dryer Stretch | −2.5%/STD | −2.5%/STD | 10% | 10% | 15% | 15% | 20% | 20% | 30% | 30% |
|---|---|---|---|---|---|---|---|---|---|---|
| Code | 24 | 24 | 24 | 24 | 24 | 24 | 24 | 24 | 24 | 24 |
| Target Conditions | | | | | | | | | | |
| Machine Speeds(ft/min) | | | | | | | | | | |
| Extrusion | 128 | 128 | 128 | 128 | 128 | 128 | 128 | 128 | 128 | 128 |
| Wet End | 123.1 | 123.1 | 123.1 | 123.1 | 123.1 | 123.1 | 123.1 | 123.1 | 123.1 | 123.1 |
| Dry End | 120 | 120 | 135.4 | 135.4 | 141.5 | 141.5 | 147.7 | 147.7 | 160.0 | 1600 |
| Dryer Stretch | −2.5% | −2.5% | +10.0% | +10.0% | +15% | +15% | +20.0% | +20.0% | +30.0% | +30.0% |
| Coag | | | | | | | | | | |
| Temperature | 42.5 | 42.5 | 42.5 | 42.5 | 42.5 | 42.5 | 42.5 | 42.5 | 42.5 | 42.5 |
| Acid Conc. | 132 | 132 | 132 | 132 | 132 | 132 | 132 | 132 | 132 | 132 |
| Salt Conc. | 253 | 253 | 253 | 253 | 253 | 253 | 253 | 253 | 253 | 253 |
| BDG | 19 | 19 | 16.9 | 16.9 | 16.1 | 16.1 | 15.4 | 15.4 | 14.3 | 14.3 |
| DFW | 24 guage | 24 guage | 24 guage | 24 guage | 24 guage | 24 guage | 24 guage | 24 guage | 24 guage | 24 guage |
| Glyc Tank Passes | 2 | 2 | 2 | 2 | 2 | 2 | 2 | 2 | 2 | 2 |
| Profile | | | | | | | | | | |
| Time | | | | | | | | | | |
| PIV rpm | 73.5 | 73.3 | | | | | | | | |
| Machine Speed (fpm) | 128 | 128 | | | | | | | | |
| Casing Analyses | | | | | | | | | | |
| BDG | 19.2 | 19.1 | 17 | 17.1 | 16.2 | 16.3 | 15.8 | 15.6 | 14.5 | 14.7 |
| % BDG Change from STD 19.0 | 1.1 | 0.5 | −10.5 | −10.0 | −14.7 | −14.2 | −16.8 | −17.9 | −23.7 | −22.6 |
| pH | 9.2 | 9.3 | 9.3 | 9.3 | 9.2 | 9 | 9.1 | 9.1 | 9.3 | 9.2 |
| % Glycerine | 15.7 | 15.6 | 15.7 | 15.7 | 15.3 | 15.1 | 15.7 | 15.7 | 15.9 | 15.6 |
| Rewet Burst Press | 33.84 | 34.01 | 33.04 | 33.92 | 33.84 | 33.69 | 32.84 | 31.93 | 30.32 | 31.20 |
| Burst Dia. | 38.24 | 35.72 | 38.33 | 37.96 | 37.02 | 37.79 | 38.37 | 35.05 | 35.51 | 35.67 |
| Rewet long. Instrons | | | | | | | | | | |
| Film Thickness (inches) | 0.0017 | 0.0016 | 0.0016 | 0.0015 | 0.0015 | 0.0014 | 0.0014 | 0.0014 | | |
| Force to Break 1" (lbs) | 6.040 | 6.290 | 5.74 | 5.7 | 5.94 | 6.13 | 6.59 | 6.12 | | |
| Max. Mod. (psi) | 14519 | 15733 | 23811 | 25394 | 30164 | 33830 | 39478 | 38551 | | |
| Max. Tensile (psi) | 7102 | 7861 | 7172 | 7617 | 7925 | 8758 | 9416 | 8743 | | |
| Rewet Trans. Instrons | | | | | | | | | | |
| Film Thickness (inches) | 0.0017 | 0.0016 | 0.0016 | 0.0015 | 0.0015 | 0.0014 | 0.0014 | 0.0014 | | |
| Force to Break 1" (lbs) | 10.170 | 10.660 | 9.73 | 9.73 | 9.29 | 8.5 | 7.72 | 8.7 | | |
| Max. Mod. (psi) | 8831 | 9531 | 8982 | 9642 | 9276 | 9791 | 9370 | 9493 | | |
| Max. Tensile (psi) | 6007 | 6661 | 6086 | 6503 | 6195 | 6092 | 5516 | 6212 | | |

What is claimed is:

1. A tubular film for encasing food comprising an extruded fiber web free tubular material which has been regenerated from a solution of cellulose in a solvent comprising carbon disulfide and dried in a dryer, said tubular film being longitudinally stretched in the dryer by from 10 to 30 percent and transversely stretched while wet, the stretch being maintained during drying, said tubular film having a longitudinal rewet tensile strength of at least 7000 psi; a wall thickness of between 18 and 25 microns and a wall thickness that is from 75 to 90 percent of a tubular film which is identical except for being longitudinally unstretched in the dryer by from 10 to 30 percent; wherein said tubular film has a rewet longitudinal tensile strength greater than its transverse rewet tensile strength.

2. The film of claim 1 wherein transverse stretch is less than 75% of longitudinal stretch.

3. The tubular film of claim 1 wherein said film is longitudinally stretched by from 10 to 20 percent said stretch being maintained in the dryer.

4. The tubular film of claim 1 having a wall thickness of from 21 to 23 microns.

5. The tubular film of claim 1 having a permeability which is 20 to 50 percent greater than the same film except being longitudinally unstretched said stretch being maintained in the dryer.

6. The tubular film of claim 1 wherein the film has a burst pressure of at least 88 percent of the burst pressure of the same film except being longitudinally unstretched.

7. A process for making the tubular film of claim 1 which comprises extruding a tubular film from viscose; coagulating the film in a bath comprising acid and salt to form a regenerated cellulose tubular film; transversely stretching the film while wet; and longitudinally stretching the film by from 10 to 30 percent in a dryer to form a dry tubular film wherein the transverse stretch is less than 75 percent of longitudinal stretch, said tubular film having a wall thickness of between 18 and 25 microns and from 75 to 90 percent of a tubular film which is identical except for being longitudinally unstretched in the dryer by from 10 to 30 percent.

8. The process of claim 7 wherein the film is transversely stretched by from −3 to +10 percent while wet.

9. A tubular film for encasing food comprising an extruded fiber web free tubular material that has been regenerated from a solution of cellulose in a solvent comprising carbon disulfide and dried in a drier, said tubular film having a wall thickness of between 18 and 23 microns, a longitudinal rewet tensile strength of at least 7000 mpsi, and a rewet longitudinal tensile strength greater than transverse rewet tensile strength.

* * * * *

UNITED STATES PATENT AND TRADEMARK OFFICE
CERTIFICATE OF CORRECTION

PATENT NO : 6,120,861

DATED : September 19, 2000

INVENTOR(S) : Mark van der Bleek, et al.

It is certified that error appears in the above-identified patent and that said Letters Patent is hereby corrected as shown below:

In Claim 9, line 15, replace "mpsi" with "psi".

Signed and Sealed this

Fifteenth Day of May, 2001

*Attest:*

NICHOLAS P. GODICI

*Attesting Officer*    *Acting Director of the United States Patent and Trademark Office*